US011555546B2

(12) United States Patent
Nagao et al.

(10) Patent No.: US 11,555,546 B2
(45) Date of Patent: Jan. 17, 2023

(54) SHAKE-PREVENTION-MECHANISM—INCLUDING GATE VALVE

(71) Applicant: SMC CORPORATION, Tokyo (JP)

(72) Inventors: Takashi Nagao, Abiko (JP); Hidefumi Ikeda, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/696,139

(22) Filed: Mar. 16, 2022

(65) Prior Publication Data
US 2022/0299119 A1 Sep. 22, 2022

(30) Foreign Application Priority Data

Mar. 19, 2021 (JP) .............................. JP2021-046214

(51) Int. Cl.
*F16K 3/02* (2006.01)
*F16K 3/314* (2006.01)
*F16K 3/18* (2006.01)
*F16K 51/02* (2006.01)

(52) U.S. Cl.
CPC ............ *F16K 3/184* (2013.01); *F16K 3/0218* (2013.01); *F16K 3/0254* (2013.01); *F16K 3/0281* (2013.01); *F16K 3/314* (2013.01); *F16K 51/02* (2013.01)

(58) Field of Classification Search
CPC ...... F16K 51/02; F16K 3/0254; F16K 3/0218; F16K 3/0281; F16K 3/184; F16K 3/314; F16K 3/3165; F16K 3/316
See application file for complete search history.

(56) References Cited

U.S. PATENT DOCUMENTS

| 5,626,324 A | * | 5/1997 | Nakamura | F16K 51/02 |
|---|---|---|---|---|
| | | | | 251/158 |
| 6,082,706 A | * | 7/2000 | Irie | F16K 3/184 |
| | | | | 251/158 |
| 6,095,180 A | * | 8/2000 | Ishigaki | F16K 49/002 |
| | | | | 137/341 |

(Continued)

FOREIGN PATENT DOCUMENTS

| DE | 10 2014 109 673 A1 | 1/2015 |
|---|---|---|
| JP | 2013-096557 A | 5/2013 |
| JP | 2018-071642 A | 5/2018 |

OTHER PUBLICATIONS

Extended European Search Report dated Aug. 30, 2022 in European Patent Application No. 22160693.2, 6 pages.

*Primary Examiner* — David Colon-Morales
(74) *Attorney, Agent, or Firm* — Oblon, McClelland, Maier & Neustadt, L.L.P.

(57) ABSTRACT

In a connection mechanism that connects a valve shaft to air cylinders, shake prevention mechanisms are disposed at facing portions at which outer side surfaces of side frames face inner side surfaces of housings of the air cylinders and/or facing portions at which inner side surfaces and of the side frames face left-hand and right-hand side surfaces of a center frame. The shake prevention mechanisms include a sliding member that is disposed on a sliding surface that is formed on one of two surfaces that face each other and on the other and a spring mechanism that presses the sliding member in a direction in which the sliding member comes into contact with the sliding surface.

7 Claims, 10 Drawing Sheets

(56) References Cited

U.S. PATENT DOCUMENTS

| | | | | |
|---|---|---|---|---|
| 6,736,368 | B2* | 5/2004 | Osawa | F16K 3/184 |
| | | | | 251/158 |
| 8,800,956 | B2* | 8/2014 | Ishigaki | F16K 3/184 |
| | | | | 251/203 |
| 9,404,589 | B2* | 8/2016 | Ishigaki | F16K 3/184 |
| 9,599,233 | B2* | 3/2017 | Ishigaki | F16K 51/02 |
| 10,364,901 | B2* | 7/2019 | Iwabuchi | F16K 3/182 |
| 11,118,693 | B2* | 9/2021 | Yabe | F16K 3/184 |
| 11,149,860 | B2* | 10/2021 | Kimori | F16K 37/0041 |
| 11,209,092 | B2* | 12/2021 | Iwabuchi | F16K 1/303 |
| 11,255,464 | B2* | 2/2022 | Shimoda | F16K 31/1225 |
| 2020/0096127 | A1 | 3/2020 | Iwabuchi | |
| 2020/0208755 | A1 | 7/2020 | Shimoda et al. | |
| 2020/0355275 | A1 | 11/2020 | Yabe et al. | |

* cited by examiner

SHAKE-PREVENTION-MECHANISM—INCLUDING GATE VALVE

TECHNICAL FIELD

The present prevention relates to a gate valve that is mounted in a vacuum chamber in a semiconductor-processing apparatus and that is used for opening and closing a gate of the vacuum chamber, and particularly to a gate valve that includes a shake prevention mechanism for stabilizing the opening-closing operation of a valve plate.

BACKGROUND ART

For a semiconductor-processing apparatus, a gate valve as disclosed in patent literature (PTL) 1 is used for opening and closing a gate of a vacuum chamber. The gate valve includes a valve plate that opens and closes an opening of a valve box in communication with the gate, a valve shaft that is connected to the valve plate, and an operation unit that performs the opening-closing operation of the valve plate with the valve shaft interposed therebetween.

The operation unit includes a bonnet that is mounted on a bottom portion of the valve box and that has a central portion through which the valve shaft movably extends, two air cylinders that are mounted on the bonnet such that the two air cylinders are parallel to each other with the valve shaft put therebetween, and a connection mechanism that is interposed between the two air cylinders, that connects rods of the two air cylinders and the valve shaft to each other, and that transmits forward and backward motion of the rods to the valve shaft. The two air cylinders cause the valve shaft to move forward and backward (move upward and downward) with the connection mechanism interposed therebetween, and the valve plate consequently opens and closes the opening of the valve box. In PTL 1 described above, the connection mechanism includes a rod arm 24, a cam frame 28, a lever member 12, and a compression spring 25.

Typically, such a gate valve is likely to pose a problem in that the synchronization of the two air cylinders is disabled, the connection mechanism consequently shakes in the left-right direction and comes into contact with the bodies of the air cylinders, the valve shaft described above and the valve plate tilt in the left-right direction, and a contact portion wears when the operation unit performs the opening-closing operation of the valve plate, if there is a gap between members that move relatively to each other with the members being proximate to each other, such as housings of the two air cylinders and a cam frame of the connection mechanism. For this reason, in the case where there is the gap described above, the opening-closing operation of the valve plate needs to be stabilized by filling the gap.

As for a vacuum gate valve disclosed in PTL 2, thrust bearings are mounted on both of left-hand and right-hand side surfaces of a valve opening-closing drive body, and the thrust bearings are in contact with inner side surfaces of housing bodies in order to eliminate gaps between the housing bodies of two air cylinders and the valve opening-closing drive body corresponding to the connection mechanism.

However, it is very difficult for the gaps that are interposed between the inner side surfaces of the two housing bodies and both of the side surfaces of the valve opening-closing drive body to be filled by thrust bearings that have thicknesses quite suitable for the gaps, and gaps are likely to be formed due to an error.

CITATION LIST

Patent Literature

PTL 1: Japanese Unexamined Patent Application Publication No. 2013-96557
PTL 2: Japanese Unexamined Patent Application Publication No. 2018-71642

SUMMARY OF INVENTION

Technical Problem

It is a technical problem of the present prevention to prevent members from shaking due to a gap and to stabilize the opening-closing operation of a valve plate by eliminating the gap between the members that move relatively to each other during the opening-closing operation of the valve plate in a gate valve that performs the opening-closing operation of the valve plate that is connected to a valve shaft by using an operation unit that includes two air cylinders with a connection mechanism interposed therebetween.

Solution to Problem

To solve the problem described above, a shake-prevention-mechanism-including gate valve according to the present prevention includes a valve plate that opens and closes an opening of a valve box, a valve shaft that is connected to the valve plate, and an operation unit that performs an opening-closing operation of the valve plate with the valve shaft interposed therebetween. The operation unit includes a bonnet through which the valve shaft movably extends, two air cylinders that are mounted on the bonnet such that the two air cylinders are parallel to a central axis of the valve shaft with the valve shaft put therebetween, and a connection mechanism that is interposed between the two air cylinders, that connects rods of the two air cylinders and the valve shaft to each other, and that transmits forward and backward motion of the rods to the valve shaft. The connection mechanism includes a base frame that is connected to the rods of the two air cylinders, two side frames that are mounted on the base frame, that are disposed between housings of the two air cylinders, and that move along the housings, and a center frame that is connected to the valve shaft, that is disposed between the two side frames, and that moves along the side frames. A single or plurality of shake prevention mechanisms for preventing a shake when the operation unit performs the opening-closing operation of the valve plate is disposed at at least a single facing portion among two facing portions at which outer side surfaces of the two side frames face respective inner side surfaces of the two housings and two facing portions at which inner side surfaces of the two side frames face respective left-hand and right-hand side surfaces of the center frame. The single or plurality of shake prevention mechanisms includes a sliding member that is disposed on a sliding surface that is formed on one of two side surfaces that face each other and on the other and a spring mechanism that presses the sliding member in a direction in which the sliding member comes into contact with the sliding surface.

According to the present prevention, the single or plurality of shake prevention mechanisms may include a spacer that is interposed between the spring mechanism and the sliding member and that transmits spring force of the spring mechanism to the sliding member and a set screw for securing the spacer, and the spacer may be secured by the set screw at a position at which the spring force of the spring mechanism is transmitted to the sliding member and at which the sliding member is pressed against the sliding surface.

In this case, the housings preferably have a containing hole, the containing hole preferably includes a hole-bottom small-diameter portion and a hole-opening large-diameter portion, the spring mechanism and the spacer are preferably contained in the small-diameter portion, and the sliding member is preferably contained in the large-diameter portion.

In addition, the small-diameter portion preferably has a circular shape, the large-diameter portion preferably has a long hole shape that is elongated in a direction of the central axis. The spring mechanism preferably includes a disc spring that has an annular shape, the spacer preferably has a column shape, and the sliding member preferably has an oval shape that is elongated in the direction of the central axis.

Furthermore, the sliding member is preferably composed of synthetic resin and has a contact surface in contact with the sliding surface, and the contact surface preferably has a plurality of grease-holding holes.

According to the present prevention, the plurality of shake prevention mechanisms is preferably disposed at at least a facing portion of the two facing portions at which the outer side surfaces of the two side frames face the respective inner side surfaces of the two housings, and the plurality of shake prevention mechanisms is preferably arranged in a direction in which the housings and the side frames move relatively to each other.

In addition, the plurality of shake prevention mechanisms is preferably disposed at at least a facing portion of the two facing portions at which the inner side surfaces of the two side frames face the respective left-hand and right-hand side surfaces of the center frame, and the plurality of shake prevention mechanisms is preferably disposed at different positions in a forward-rear direction of the side frames and the center frame.

Advantageous Effects of Invention

According to the present prevention, a shake prevention mechanism is disposed at a facing portion at which members that move relatively to each other when the opening-closing operation of a valve plate is performed face each other, and the shake prevention mechanism includes a sliding member that is disposed on a sliding surface that is formed on one of side surfaces at the facing portion and on the other side surface and a spring mechanism that presses the sliding member against the sliding surface. This structure enables the sliding member to be pressed against the sliding surface due to spring force of the spring mechanism and accordingly enables a gap between both side surfaces at the facing portion to be eliminated with certainty. Consequently, the members are prevented from shaking due to the gap, and the opening-closing operation of the valve plate can be stable.

DESCRIPTION OF EMBODIMENTS

Figure 1:
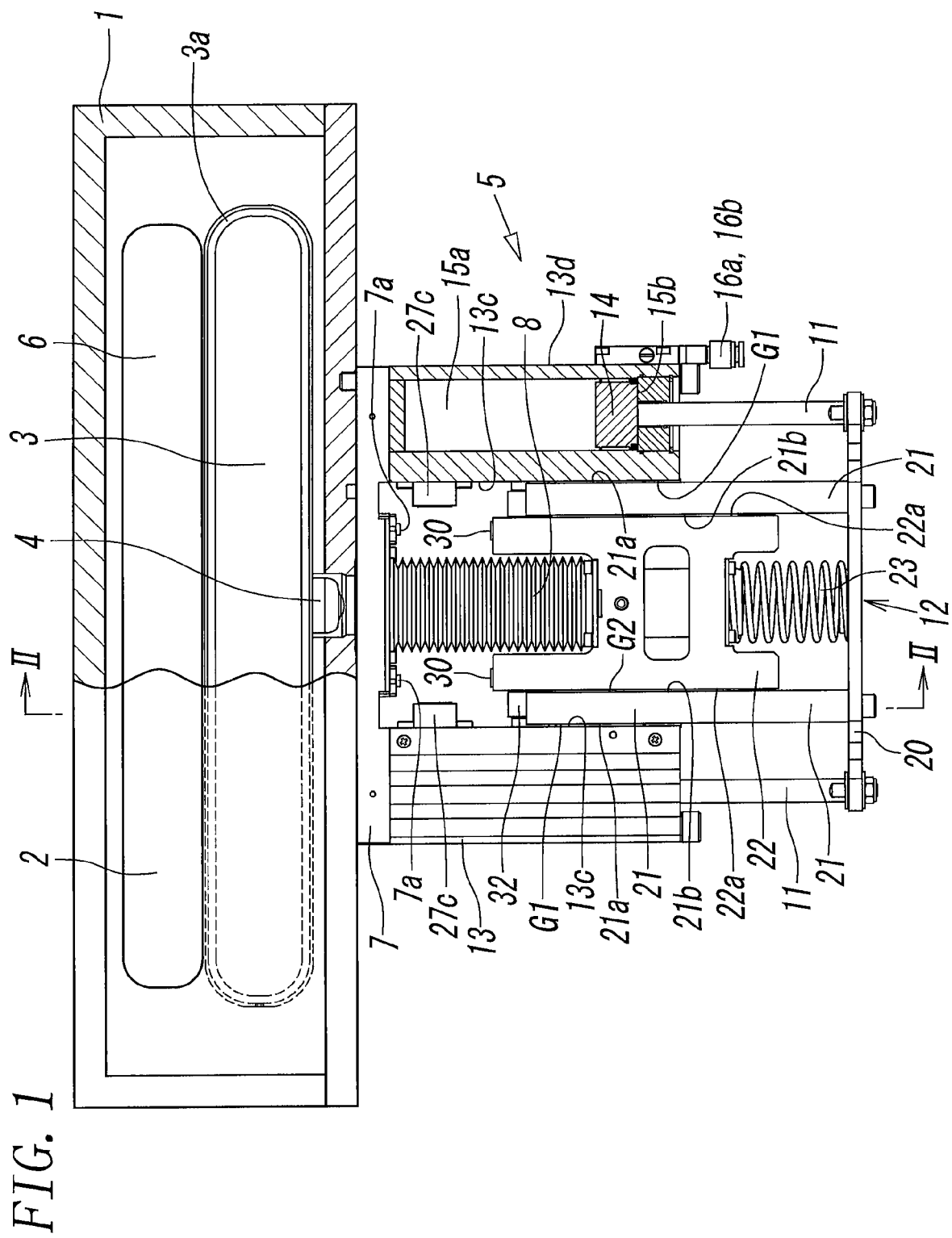
FIG. 1 is a front view of a cut portion of a gate valve according to the present prevention with a valve plate positioned at an open position.
Figure 2:
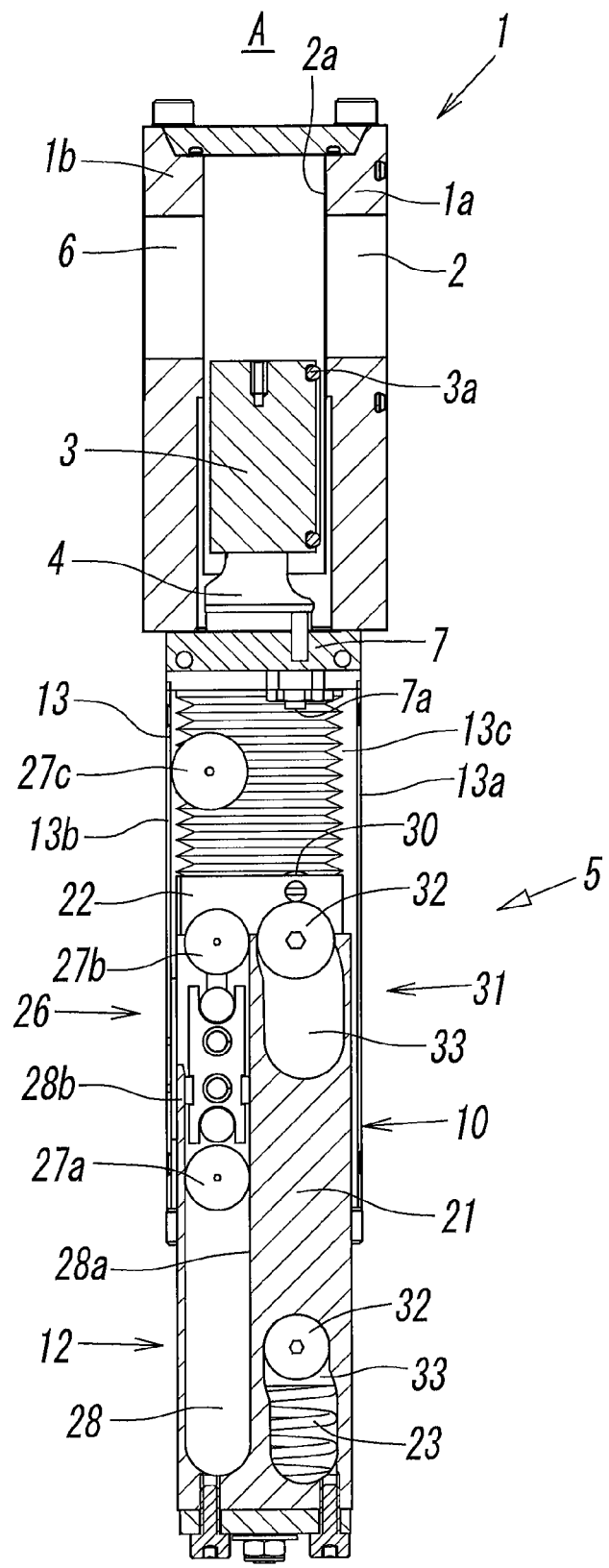
FIG. 2 is a sectional view taken along line II-II in FIG. 1.

FIG. 1 to FIG. 10 illustrate a shake-prevention-mechanism-including gate valve according to the present prevention. As illustrated in FIG. 1 and FIG. 2, the gate valve includes a valve box 1 that has an opening 2 in communication with a gate of a vacuum process chamber (not illustrated), a valve plate 3 that is contained in the valve box 1 and that opens and closes the opening 2, a valve shaft 4 that is connected to the valve plate 3, and an operation unit 5 that performs the opening-closing operation of the valve plate 3 with the valve shaft 4 interposed therebetween.

The valve box 1 is a rectangular box that is elongated in a left-right direction and includes a front wall 1a and a rear wall 1b that face each other. The front wall 1a and the rear wall 1b have the opening 2 and an opening 6 via which an object to be processed such as a semiconductor wafer is taken out or put into.

The opening 2 has a rectangular shape that is elongated in the left-right direction. A valve sheet 2a that surrounds the opening 2 and that is flat is formed on the inner surface of the front wall 1a. A valve seal 3a that is mounted on the valve plate 3 is pressed against the valve sheet 2a, and the opening 2 is consequently closed.

Figure 3:
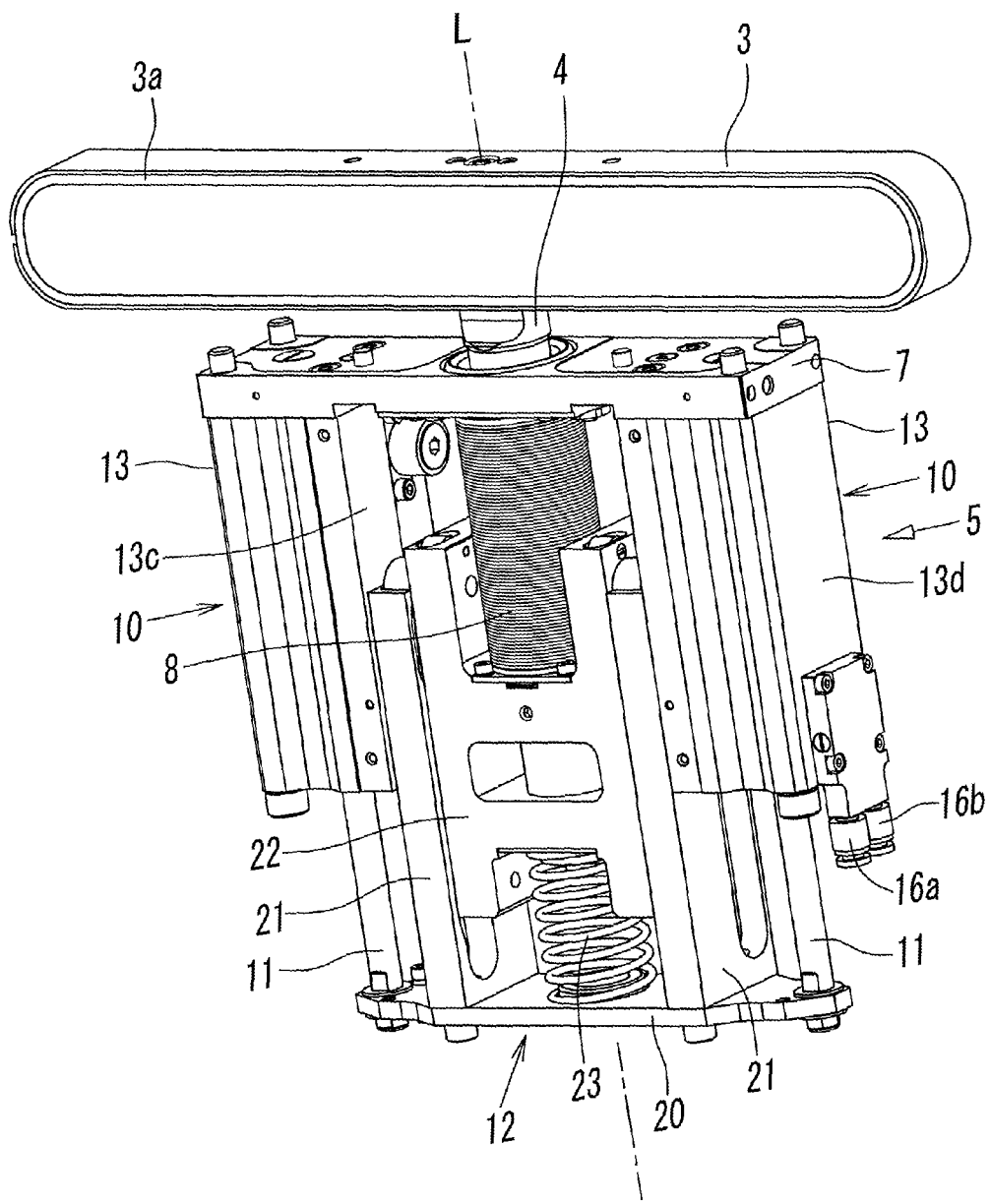
FIG. 3 is a perspective view of the gate valve with a valve box omitted.

As clear from FIG. 3, the valve plate 3 has an annular seal groove on an outer circumferential portion of the front surface thereof, and the valve seal 3a that is composed of an elastic material and that has an annular shape such as an O-ring is mounted in the seal groove.

The valve shaft 4 extends through a central portion of a bonnet 7 that is secured to a bottom portion of the valve box 1 so as to be movable in the direction of the central axis L of the valve shaft 4 and the forward-rear direction of the bonnet 7. An upper end portion of the valve shaft 4 is connected to a central portion of the bottom surface of the valve plate 3. A lower end portion of the valve shaft 4 extends to the position of the operation unit 5 and is connected to a center frame 22 of a connection mechanism 12 described later.

An upper end portion and a lower end portion of a bellows 8 that airtightly surrounds the outer circumference of the valve shaft 4 are connected to the bonnet 7 and the center frame 22. The bellows 8 isolates the inner portion of the valve box 1 from the outside. The bellows 8 expands and contracts due to upward and downward motion of the valve shaft 4.

Figure 4:
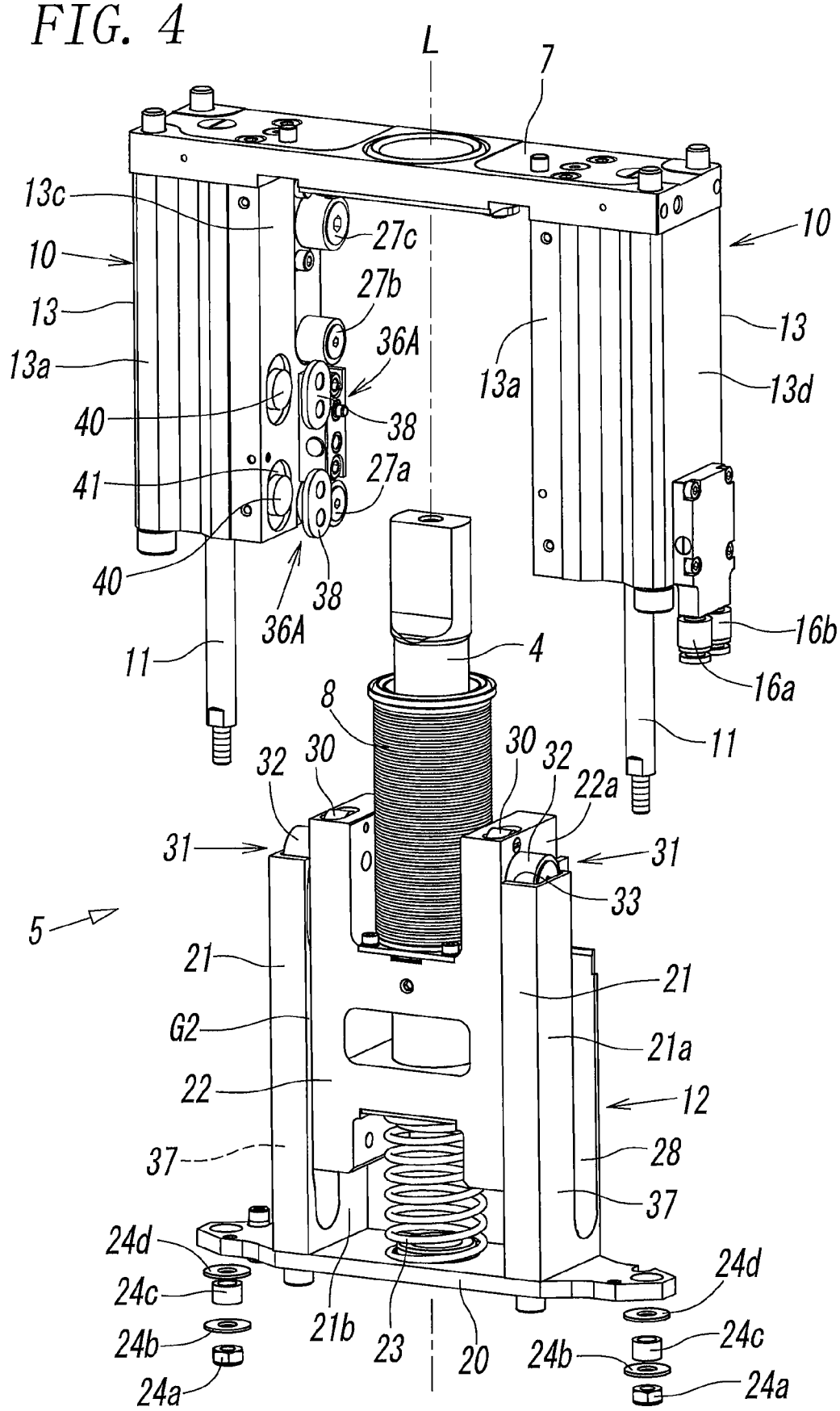
FIG. 4 is an exploded perspective view of a part of FIG. 3.

As clear from FIG. 4, the operation unit 5 includes the bonnet 7 that has a plate shape, two air cylinders 10 and 10 that are mounted on the lower surface of the bonnet 7 such that the two air cylinders 10 and 10 are parallel to the central axis L and are parallel to each other with the valve shaft 4 put therebetween, and the connection mechanism 12 that is interposed between the two air cylinders 10 and 10, that connects rods 11 and 11 of the two air cylinders 10 and 10 and the valve shaft 4 to each other, and that transmits forward and backward motion of the rods 11 and 11 to the valve shaft 4.

The two air cylinders 10 and 10 have substantially the same structure. Each air cylinder 10 includes a housing 13 that has a quadrangular prism shape and that is hollow. The housing 13 has a front surface 13a that faces in the forward direction of the operation unit 5, a back surface 13b that faces in the backward direction of the operation unit 5, an inner side surface 13c that faces the valve shaft 4, and an outer side surface 13d that faces away from the inner side surface 13c. Accordingly, the inner side surfaces 13c and 13c of the two air cylinders 10 and 10 face each other with the valve shaft 4 interposed therebetween.

An end portion of each rod 11 extends downward from the housing 13 of the air cylinder 10. A base end portion of each rod 11 is connected to a piston 14 that is contained in the housing 13. A first pressure chamber 15a on the upper surface of the piston 14 and a second pressure chamber 15b on the lower surface of the piston 14 are formed in the housing 13.

The outer side surface 13d of the housing 13 of one of the air cylinders 10 of the two air cylinders 10 and 10 has two airports 16a and 16b, one of which is the first airport 16a that is in communication with the first pressure chambers 15a and 15a of the two air cylinders 10 and 10 via a vent that is formed in the housing 13 and the bonnet 7, and the other of which is the second airport 16b that is in communication with the second pressure chambers 15b and 15b of the two air cylinders 10 and 10 via another vent that is formed in the housing 13 and the bonnet 7 in the same manner.

Compressed air is alternately supplied into and exhausted from the first pressure chambers 15a and 15a and the second pressure chambers 15b and 15b of the two air cylinders 10 and 10 via the first airport 16a and the second airport 16b, and consequently, the two air cylinders 10 and 10 synchronously operate. Specifically, when the compressed air is supplied to the first pressure chambers 15a and 15a of the two air cylinders 10 and 10 via the first airport 16a, and the compressed air is exhausted to the outside from the second pressure chambers 15b and 15b of the two air cylinders 10 and 10 via the second airport 16b, the two rods 11 and 11 of the two air cylinders 10 and 10 are synchronized and descend (move forward) as illustrated in FIG. 1 and FIG. 2, and the valve shaft 4 and the valve plate 3 descend to an open position A at which the opening 2 fully opens with the connection mechanism 12 interposed therebetween.

Figure 5:
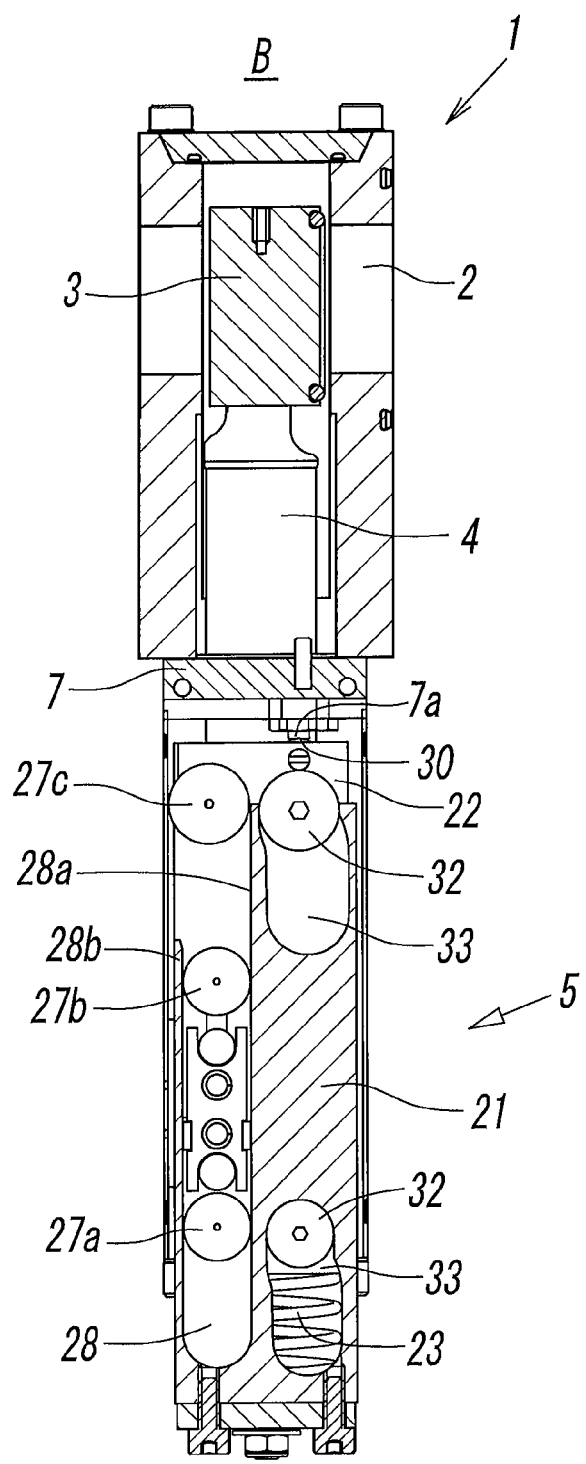
FIG. 5 is a sectional view of the gate valve with the valve plate positioned at an intermediate position.
Figure 6:
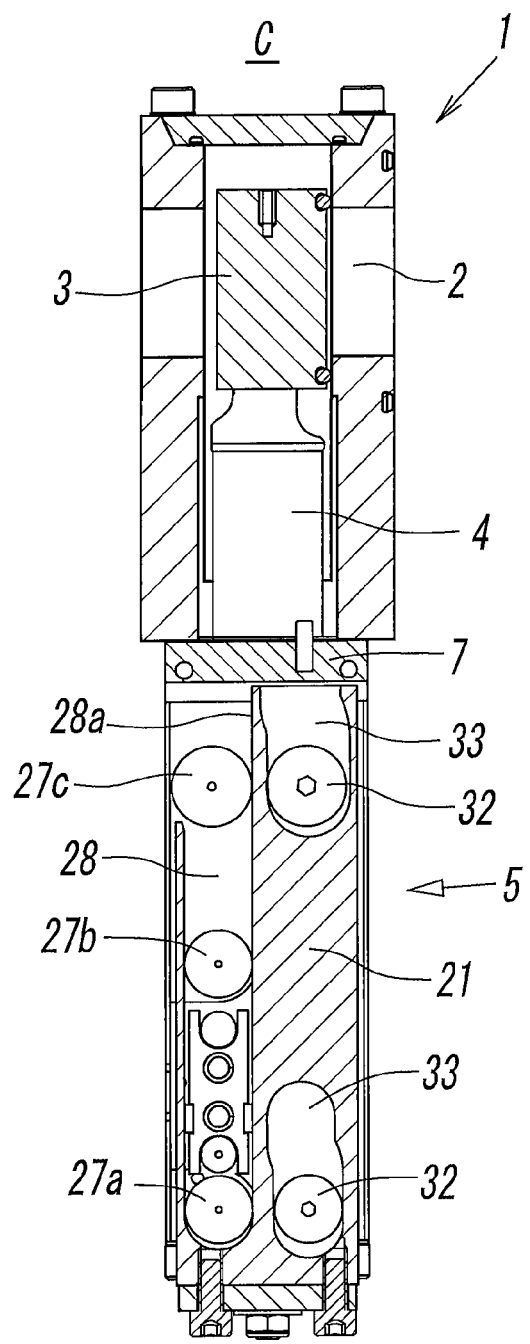
FIG. 6 is a sectional view of the gate valve with the valve plate positioned at a close position.

When the compressed air is supplied to the second pressure chambers 15b and 15b of the two air cylinders 10 and 10 via the second airport 16b, and the compressed air in the first pressure chambers 15a and 15a of the two air cylinders 10 and 10 is exhausted via the first airport 16a with the valve plate 3 positioned at the open position A, the two rods 11 and 11 of the two air cylinders 10 and 10 are synchronized and ascend (move backward), the valve shaft 4 and the valve plate 3 pass through an intermediate position B at which the valve plate 3 faces the opening 2 of the valve box 1 with the valve plate 3 spaced therefrom but does not close the opening 2 as illustrated in FIG. 5, and move to a close position C at which the valve plate 3 closes the opening 2 as illustrated in FIG. 6 with the connection mechanism 12 interposed therebetween.

The structure of the connection mechanism 12 will now be described together with the action thereof. As illustrated in FIG. 1 to FIG. 4, the connection mechanism 12 includes a base frame 20 that extends between end portions of the rods 11 and 11 of the two air cylinders 10 and 10, two side frames 21 and 21 that include base end portions secured to the upper surface of the base frame 20 and that are parallel to the central axis L and parallel to each other with the central axis L put therebetween, the center frame 22 that is mounted on the lower end portion of the valve shaft 4 and that is disposed between the two side frames 21 and 21 such that the center frame 22 is movable relatively to the side frames 21 and 21, and a compression spring 23 that is interposed between the center frame 22 and the base frame 20 and that has a coil shape.

As illustrated in FIG. 4, the rods 11 and 11 and the base frame 20 are connected to each other by using nuts 24a with washers 24b and 24d and collars 24c interposed therebetween.

Outer side surfaces 21a and 21a of the two side frames 21 and 21 face the respective inner side surfaces 13c and 13c of the housings 13 and 13 of the two air cylinders 10 and 10 with small gaps G1 interposed therebetween. The rods 11 and 11 of the two air cylinders 10 and 10 cause the valve plate 3 to move from the open position A to the close position C via the intermediate position B, and in conjunction with this, the two side frames 21 and 21 move along the inner side surfaces 13c and 13c of the housings 13 and 13 downward in the figure.

Parallel movement mechanisms 26 for moving the side frames 21 parallel (in the vertical direction in FIG. 1) to the central axis L along the inner side surfaces 13c of the housings 13 when the side frames 21 move from the open position A to the close position C are formed between the inner side surfaces 13c and 13c of the housings 13 and 13 of the two air cylinders 10 and 10 and the two side frames 21 and 21.

Each of the parallel movement mechanisms 26 includes multiple (three in the figure) guide rollers 27a, 27b, and 27c that are mounted on the inner side surface 13c of the housing 13 and that are arranged in the vertical direction and a guide groove 28 that is formed on the side frame 21 linearly in the vertical direction.

Among the three guide rollers 27a, 27b, and 27c, the first guide roller 27a at the lowest position and the second guide roller 27b at a middle position have the same diameter, can be fitted into the guide groove 28, and the third guide roller 27c at the highest position have a diameter larger than those of the first guide roller 27a and the second guide roller 27b and larger than the width of the guide grooves 28.

The guide groove 28 has a constant width. An upper end portion of the back surface wall 28b of a front surface wall 28a and a back surface wall 28b of the guide groove 28 is cut to prevent the third guide roller 27c that has a larger diameter from colliding when the side frame 21 ascends from the intermediate position B to the close position C. At this time, the third guide roller 27c comes into contact with only the front surface wall 28a.

However, the three guide rollers 27a, 27b, and 27c may have the same diameter. In this case, it is not necessary to cut the upper end portion of the back surface wall 28b of the guide groove 28.

The action of each parallel movement mechanisms 26 is as follows. That is, when the rods 11 and 11 of the air cylinders 10 and 10 descend, and the valve plate 3 is positioned at the open position A in FIG. 2, the side frames 21 also descend. At this time, only the first guide rollers 27a are fitted into the guide grooves 28.

When the rods 11 and 11 ascend, and the side frames 21 ascend in this state, the second guide rollers 27b are also fitted into the guide grooves 28, and the first guide rollers 27a and the second guide rollers 27b guide the side frames 21 that ascend. Accordingly, the side frames 21 can straightly ascend parallel to the central axis L along the inner side surfaces 13c of the housings 13 until the side frames 21 reach the close position C. When the side frames 21 reach the intermediate position B, the third guide rollers 27c come into contact with the front surface walls 28a of the guide grooves 28. Accordingly, the side frames 21 that ascend are then guided also by the third guide rollers 27c.

The center frame 22 has a H-shape in a front view and has left-hand and right-hand side surfaces 22a and 22a. The left-hand and right-hand side surfaces 22a and 22a face respective inner side surfaces 21b and 21b of the two side frames 21 and 21 with small gaps G2 interposed therebetween. A base end portion of the valve shaft 4 is mounted on a central portion of the center frame 22. Contact portions 30 that include rollers that come into contact with stoppers 7a on the lower surface of the bonnet 7 are formed on an upper end surface of the center frame 22. While the rods 11 and 11 ascend, and the valve plate 3 moves from the open position A to the close position C, the center frame 22 ascends to the intermediate position B together with the base frame 20, the side frames 21 and 21, and the compression spring 23. At the intermediate position B, the contact portions 30 come into contact with the stoppers 7a of the bonnet 7, and the center frame 22 consequently stops at the intermediate position B.

Subsequently, the rods 11 and 11 further ascend, and the base frame 20 and the side frames 21 and 21 further ascend while the compression spring 23 is compressed. Accordingly, the center frame 22 moves toward the close position C in a direction perpendicular to the central axis L due to the action of cam mechanisms 31 that are formed on the center frame 22 and the side frames 21 and 21, the valve plate 3 is pressed against the opening 2 with the valve shaft 4 interposed, and the opening 2 is closed.

Each of the cam mechanisms 31 includes two upper cam rollers 32 and 32 that are mounted on the respective left-hand and right-hand side surfaces 22a and 22a of the center frame 22, two lower cam rollers 32 and 32 that are mounted on the left-hand and right-hand side surfaces 22a and 22a of the center frame 22, two upper cam grooves 33 and 33 that are formed on the respective two side frames 21 and 21, and two lower cam grooves 33 and 33 that are formed on the respective two side frames 21 and 21. The cam rollers 32 and 32 are fitted into the respective cam grooves 33 and 33.

The cam grooves 33 and 33 are not straight grooves in the vertical direction but partly tilt in the left-right direction. Accordingly, when the side frames 21 and the cam grooves 33 and 33 ascend from the intermediate position B to the close position C with respect to the center frame 22 and the cam rollers 32 and 32, the cam rollers 32 and 32 are pushed in the right-hand direction in FIG. 5 along the tilt of the cam grooves 33 and 33, and the center frame 22 also moves in the same direction as in the cam rollers 32 and 32. Consequently, the valve shaft 4 and the valve plate 3 move from the intermediate position B to the close position C, and the valve plate 3 is pressed against the opening 2 of the valve box 1 and closes the opening 2. At this time, reaction force that acts on the valve plate 3 is received from the valve plate 3 by the guide rollers 27a, 27b, and 27c via the valve shaft 4, the center frame 22, and the side frames 21.

When the rods 11 and 11 of the air cylinders 10 and 10 descend, and the valve plate 3 moves from the close position C to the open position A, an operation opposite that in the case described above is performed.

As illustrated in FIG. 4 and FIG. 7 to FIG. 10, the gate valve includes shake prevention mechanisms 36A and 36B, for preventing a shape due to a gap that is interposed between facing members, at facing portions at which the members that move relatively to each other when the operation unit 5 performs the opening-closing operation of the valve plate 3 face each other. In an example illustrated, the multiple shake prevention mechanisms 36A are disposed at facing portions at which the housings 13 and 13 of the air cylinders 10 and 10 face the side frames 21 and 21, and the multiple shake prevention mechanisms 36B are disposed also at facing portions at which the side frames 21 and 21 face the center frame 22.

Figure 7:
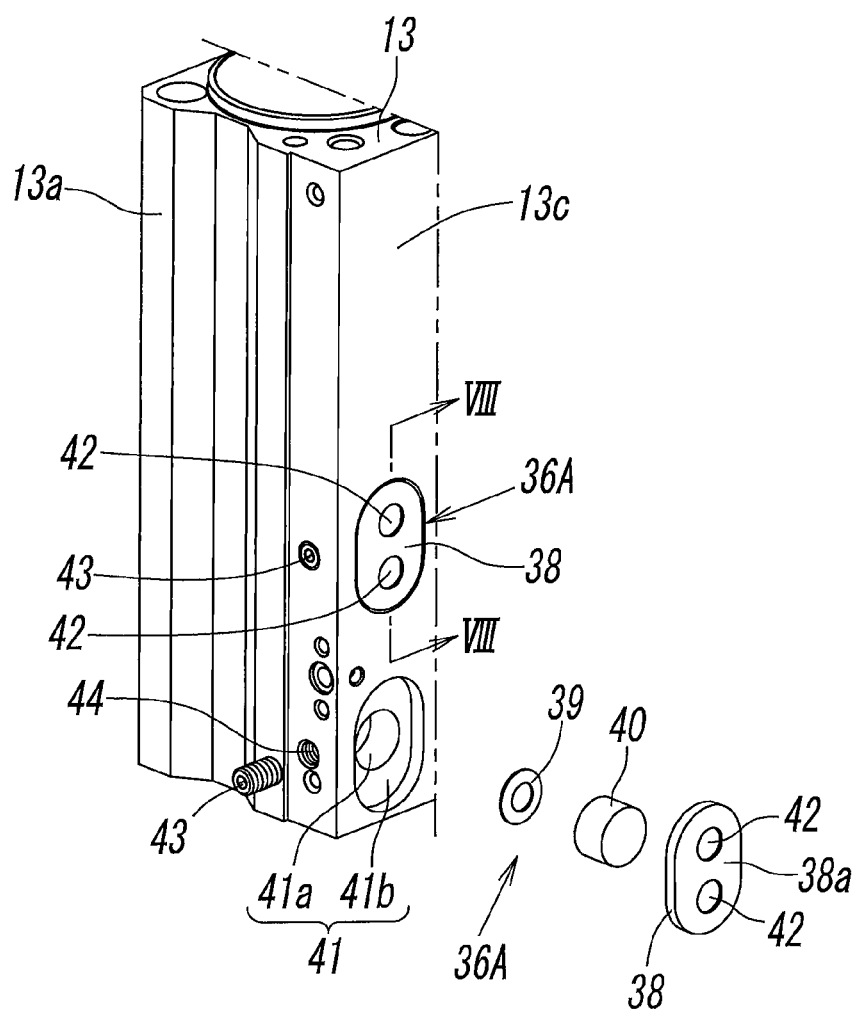
FIG. 7 is an enlarged perspective view of a principal part in FIG. 4.
Figure 8:
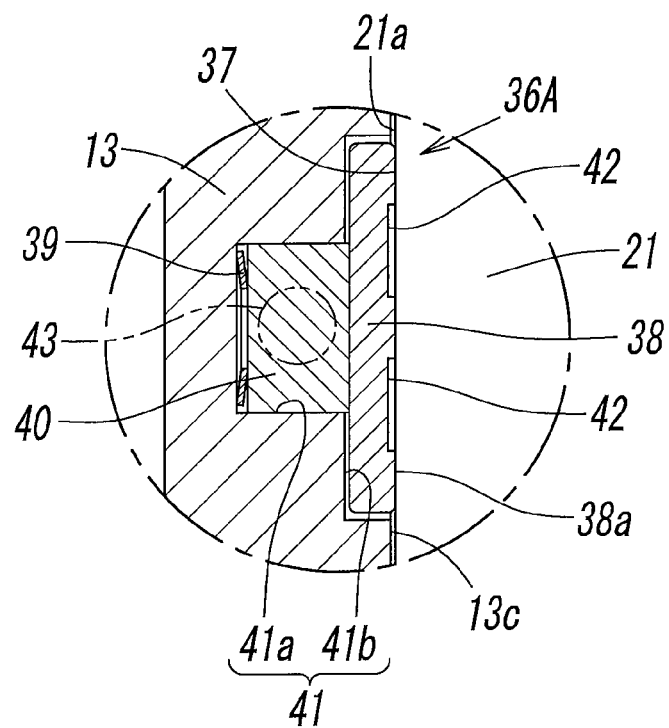
FIG. 8 is a sectional view taken along line VIII-VIII in FIG. 7.

As illustrated in FIG. 4, FIG. 7, and FIG. 8, the shake prevention mechanisms 36A are disposed at two facing portions at which the inner side surfaces 13c and 13c of the two housings 13 and 13 face the respective outer side surfaces 21a and 21a of the two side frames 21 and 21. The shake prevention mechanisms 36A prevent the side frames 21 and 21 from shaking in the left-right direction when the side frames 21 and 21 move from the open position A to the close position C along the housings 13 and 13, that is, prevent the side frames 21 and 21 from shaking in a direction in which the sizes of the gaps G1 (see FIG. 1) change.

In an example illustrated, two shake prevention mechanisms 36A and 36A are disposed at the facing portion between the inner side surface 13c of the housing 13 of one of the air cylinders 10 and the outer side surface 21a of one of the side frames 21, and two shake prevention mechanisms 36A and 36A are disposed at the facing portion between the inner side surface 13c of the housing 13 of the other air cylinder 10 and the outer side surface 21a of the other side frame 21.

Each of the shake prevention mechanisms 36A includes a sliding member 38 that is disposed on a sliding surface 37 that is formed on the outer side surface 21a of the side frame 21 and that is flat and on the inner side surface 13c of the housing 13, a spring mechanism 39 that presses the sliding member 38 in a direction in which the sliding member 38 comes into contact with the sliding surface 37, and a spacer 40 that is interposed between the spring mechanism 39 and the sliding member 38.

The sliding member 38, the spacer 40, and the spring mechanism 39 are contained in a containing hole 41 that is formed on the inner side surface 13c of the housing 13. The containing hole 41 includes a hole-bottom small-diameter portion 41a and a hole-opening large-diameter portion 41b. The small-diameter portion 41a has a circular shape. The large-diameter portion 41b has a long hole shape that is elongated in the direction of the central axis L. The depth of the large-diameter portion 41b is less than the depth of the small-diameter portion 41a. The spring mechanism 39 that includes an annular disc spring and the spacer 40 that has a short column shape are contained in the small-diameter portion 41a. The sliding member 38 that has a plate shape is contained in the large-diameter portion 41b.

The sliding member 38 is preferably composed of synthetic resin having excellent sliding properties. In addition, multiple (two in an example illustrated) grease-holding holes 42 in which grease is filled and held are preferably formed on an outer surface of the sliding member 38, that is, a contact surface 38a in contact with the sliding surface 37 and are preferably arranged in the length direction of the sliding member 38.

However, the sliding member 38 can be composed of metal. In this case, the sliding member 38 and the spacer 40 can be integrally formed in a manner in which the spacer 40 is also composed of metal.

The two shake prevention mechanisms 36A and 36A are disposed at the facing portion at which the outer side surface 21a of the side frame 21 always faces the inner side surface 13c of the housing 13, that is, the facing portion at which the outer side surface 21a of the side frame 21 faces the inner side surface 13c of the housing 13 also when the side frame 21 descends to the open position A in FIG. 1 and are arranged in the vertical direction that is a direction in which the side frame 21 and the housing 13 move relatively to each other.

The front surface 13a of the housing 13 has screw holes 44 at positions corresponding to those of the spacers 40 of the shake prevention mechanisms 36A. Set screws 43 for securing the spacers 40 are mounted in the screw holes 44 so as to be movable forward and backward through a rotation operation by using a tool. The set screws 43 are screws that have a hexagon hole and are operated as follows.

When the connection mechanism 12 is first placed between the two air cylinders 10 and 10 for assembling the operation unit 5, each sliding member 38 is strongly pushed into the containing hole 41 to compress the spring mechanism 39 (the disc spring) into a flat shape with the spacer 40 interposed therebetween. In this state, each set screw 43 is screwed, and the spacer 40 is secured there. This reduces the amount of protrusion of the sliding member 38 that protrudes from the containing hole 41. Accordingly, the connection mechanism 12 can be smoothly placed between the two air cylinders 10 and 10.

A flat portion can be formed on a part of the side surface of the spacer 40, and an end of the set screw 43 can be brought into contact with the position of the flat portion.

Subsequently, when the connection mechanism 12 has been placed, each set screw 43 is loosened once, and the spring mechanism 39 is restored. In this way, the sliding member 38 is pressed by the spring force of the spring mechanism 39 with the spacer 40 interposed therebetween, and the contact surface 38a of the sliding member 38 comes into contact with the sliding surface 37 of the side frame 21. Accordingly, the gap G1 between the inner side surface 13c of the housing 13 of each air cylinder 10 and the side frame 21 is filled with the sliding member 38. The set screw 43 is then screwed again, and the spacer 40 is secured there. This enables the sliding member 38 to be secured at a position at which the gap G1 between the sliding member 38 and the side frame 21 becomes just zero. In this state, the gate valve is used.

Figure 9:
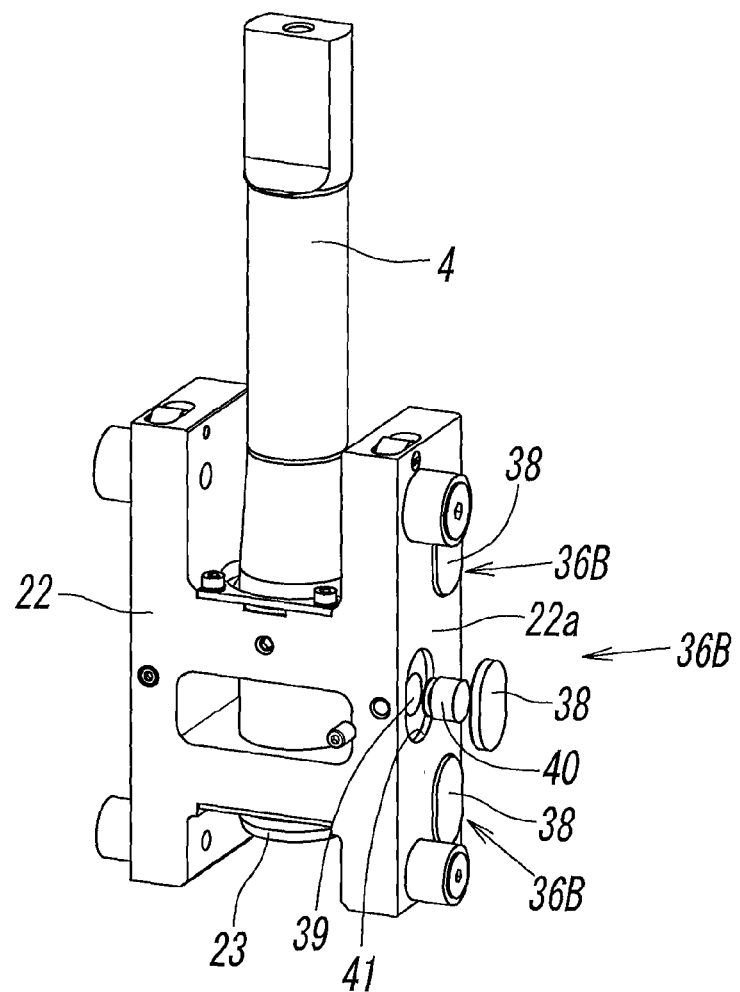
FIG. 9 is a perspective view of a center frame of a connection mechanism.
Figure 10:
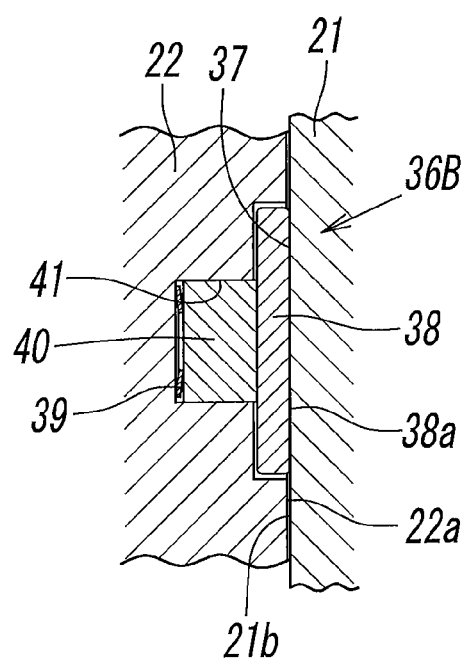
FIG. 10 is a sectional view of a principal part and illustrates a shake prevention mechanism that is disposed at a facing portion between the center frame and a side frame.

As seen from FIG. 1, FIG. 9, and FIG. 10, the shake prevention mechanisms 36B are disposed at the facing portions at which the left-hand and right-hand side surfaces 22a and 22a of the center frame 22 face the respective inner side surfaces 21b and 21b of the two side frames 21 and 21. The shake prevention mechanisms 36B prevent a shake when the side frames 21 and 21 and the center frame 22 move from the intermediate position B to the close position C relatively to each other.

In an example illustrated, three shake prevention mechanisms 36B are disposed at the facing portion between the inner side surface 21b of one of the side frames 21 and one of the side surfaces 22a of the center frame 22 with the three shake prevention mechanisms 36B away from each other in the forward-rear direction of the center frame 22, and three shake prevention mechanisms 36B are disposed at the facing portion between the inner side surface 21b of the other side frame 21 and the other side surface 22a of the center frame 22 with the three shake prevention mechanisms 36B away from each other in the forward-rear direction of the center frame 22.

Each of the shake prevention mechanisms 36B has substantially the same structure as that of each of the shake prevention mechanisms 36A and includes the sliding member 38 that is disposed on the sliding surface 37 that is formed on the inner side surface 21b of the side frame 21 and that is flat, on the side surface 22a of the center frame 22, the spring mechanism 39 that presses the sliding member 38 in the direction in which the sliding member 38 comes into contact with the sliding surface 37, and the spacer 40 that is interposed between the spring mechanism 39 and the sliding member 38. The sliding member 38, the spacer 40, and the spring mechanism 39 are contained in the containing hole 41 that is formed on the side surface 22a of the center frame 22.

The sliding member 38 of each of the shake prevention mechanisms 36B does not have the grease-holding holes 42 that the sliding member 38 of each of the shake prevention mechanisms 36A has but can have the grease-holding holes 42.

In this way, the shake prevention mechanisms 36A and 36B are disposed at the facing portions between the inner side surfaces 13c and 13c of the housings 13 and 13 of the air cylinders 10 and 10 and the outer side surfaces 21a and 21a of the side frames 21 and 21 and the facing portions between the inner side surfaces 21b and 21b of the side frames 21 and 21 and the side surfaces 22a and 22a of the center frame 22. This enables the side frames 21 and 21 and the center frame 22 to be prevented from shaking in the left-right direction with certainty when the operation unit 5 performs the opening-closing operation of the valve plate 3 and enables the opening-closing operation of the valve plate 3 to be stable.

According to the embodiment described above, each spacer 40 is secured by the set screw 43 at a position at which the spring force from the spring mechanism 39 is transmitted to the sliding member 38 and at which the sliding member 38 is pressed against the sliding surface 37. However, the spring force of the spring mechanism 39 can always act on the sliding member 38 with the spacer 40 interposed therebetween in a manner in which the spacer 40 is not secured by the set screw 43, and the set screw 43 is left loose. In this case, it is necessary to prevent the set screw 43 from falling due to, for example, a vibration or an impact. In some cases, the set screw 43 can be omitted.

According to the embodiment illustrated, the multiple shake prevention mechanisms 36A are disposed at the respective facing portions between the inner side surfaces 13c and 13c of the housings 13 and 13 of the two air cylinders 10 and 10 and the outer side surfaces 21a and 21a of the two side frames 21 and 21, and the multiple shake prevention mechanisms 36B are disposed at the respective facing portions between the inner side surfaces 21b and 21b of the two side frames 21 and 21 and the left-hand and right-hand side surfaces 22a and 22a of the center frame 22. However, the single shake prevention mechanism 36A and the single shake prevention mechanism 36B can be disposed at the respective facing portions, or only the shake prevention mechanisms 36A or the shake prevention mechanisms 36B can be disposed.

In the case where the gap between the inner side surface 13c of the housing 13 of one of the air cylinders 10 and the outer side surface 21a of one of the side frames 21 is small and negligible, the single or multiple shake prevention mechanisms 36A may be disposed only at the facing portion between the inner side surface 13c of the housing 13 of the other air cylinder 10 and the outer side surface 21a of the other side frame 21.

Similarly, in the case where the gap at the facing portion between the inner side surface 21b of one of the side frames 21 and one of the side surfaces 22a of the center frame 22 is small and negligible, the single or multiple shake prevention mechanisms 36B may be disposed only at the facing portion between the inner side surface 21b of the other side frame 21 and the other side surface 22a of the center frame 22.

In an example illustrated, the spring mechanism 39 of each of the shake prevention mechanisms 36A and 36B includes a disc spring but can include a coil spring or a rubber elastic body, or compressed air can be used.

As for each of the shake prevention mechanisms 36A, the containing hole 41, the spring mechanism 39, the spacer 40, and the sliding member 38 are formed in the housing 13, and the sliding surface 37 is formed on the side frame 21. However, the containing hole 41, the spring mechanism 39, the spacer 40, and the sliding member 38 may be formed in the side frame 21, and the sliding surface 37 may be formed on the housing 13.

Similarly, as for each of the shake prevention mechanisms 36B, the containing hole 41, the spring mechanism 39, the spacer 40, and the sliding member 38 may be formed in the side frame 21, and the sliding surface 37 may be formed on the center frame 22.

As for the gate valve, the valve shaft 4 and the valve plate 3 move from the open position A to the intermediate position B parallel to the central axis L due to the action of the parallel movement mechanisms 26 and move from the intermediate position B to the close position C perpendicularly to the central axis L due to the action of vertical movement mechanisms 31. However, the present prevention can be used for a gate valve in which the valve shaft 4 and the valve plate 3 obliquely move from the open position A or the intermediate position B to the close position C.

REFERENCE SIGNS LIST 1 valve box
2 opening
3 valve plate
4 valve shaft
5 operation unit
7 bonnet
10 air cylinder
11 rod
12 connection mechanism
13 housing
13c inner side surface
20 base frame
21 side frame
21a outer side surface
21b inner side surface
22 center frame
22a side surface
36A, 36B shake prevention mechanism
37 sliding surface
38 sliding member
38a contact surface
39 spring mechanism
40 spacer
41 containing hole
41a small-diameter portion
41b large-diameter portion
42 grease-holding hole
43 set screw
L central axis

The invention claimed is:

1. A shake-prevention-mechanism-including gate valve comprising:

a valve plate that opens and closes an opening of a valve box; a valve shaft that is connected to the valve plate; and an operation unit that performs an opening-closing operation of the valve plate with the valve shaft interposed therebetween, wherein the operation unit includes a bonnet through which the valve shaft movably extends, two air cylinders that are mounted on the bonnet such that the two air cylinders are parallel to a central axis of the valve shaft with the valve shaft put therebetween, and a connection mechanism that is interposed between the two air cylinders, that connects rods of the two air cylinders and the valve shaft to each other, and that transmits forward and backward motion of the rods to the valve shaft, wherein the connection mechanism includes a base frame that is connected to the rods of the two air cylinders, two side frames that are mounted on the base frame, that are disposed between housings of the two air cylinders, and that move along the housings, and a center frame that is connected to the valve shaft, that is disposed between the two side frames, and that moves along the side frames, wherein a single or plurality of shake prevention mechanisms for preventing a shake when the operation unit performs the opening-closing operation of the valve plate is disposed at at least a single facing portion among two facing portions at which outer side surfaces of the two side frames face respective inner side surfaces of the two housings and two facing portions at which inner side surfaces of the two side frames face respective left-hand and right-hand side surfaces of the center frame, and wherein the single or plurality of shake prevention mechanisms includes a sliding member that is disposed on a sliding surface that is formed on one of two side surfaces that face each other and on the other and a spring mechanism that presses the sliding member in a direction in which the sliding member comes into contact with the sliding surface.

2. The shake-prevention-mechanism-including gate valve according to claim 1, wherein the single or plurality of shake prevention mechanisms includes a spacer that is interposed between the spring mechanism and the sliding member and that transmits spring force of the spring mechanism to the sliding member and a set screw for securing the spacer, and the spacer is secured by the set screw at a position at which the spring force of the spring mechanism is transmitted to the sliding member and at which the sliding member is pressed against the sliding surface.

3. The shake-prevention-mechanism-including gate valve according to claim 2, wherein the housings have a containing hole, the containing hole includes a hole-bottom small-diameter portion and a hole-opening large-diameter portion, the spring mechanism and the spacer are contained in the small-diameter portion, and the sliding member is contained in the large-diameter portion.

4. The shake-prevention-mechanism-including gate valve according to claim 3, wherein the small-diameter portion has a circular shape, the large-diameter portion has a long hole shape that is elongated in a direction of the central axis, and wherein the spring mechanism includes a disc spring that has an annular shape, the spacer has a column shape, and the sliding member has an oval shape that is elongated in the direction of the central axis.

5. The shake-prevention-mechanism-including gate valve according to claim 1, wherein the sliding member is composed of synthetic resin and has a contact surface in contact with the sliding surface, and the contact surface has a plurality of grease-holding holes.

6. The shake-prevention-mechanism-including gate valve according to claim 1, wherein the plurality of shake prevention mechanisms is disposed at at least a facing portion of the two facing portions at which the outer side surfaces of the two side frames face the respective inner side surfaces of the two housings, and the plurality of shake prevention mechanisms is arranged in a direction in which the housings and the side frames move relatively to each other.

7. The shake-prevention-mechanism-including gate valve according to claim 1, wherein the plurality of shake prevention mechanisms is disposed at at least a facing portion of the two facing portions at which the inner side surfaces of the two side frames face the respective left-hand and right-hand side surfaces of the center frame, and the plurality of shake prevention mechanisms is disposed at different positions in a forward-rear direction of the side frames and the center frame.

* * * * *